J. HENDY.

Ore-Concentrators.

No. 6,165. Reissued Dec. 8, 1874.

Attest:
Jno. L. Boone
C. M. Richardson

Inventor:
Joshua Hendy

THE GRAPHIC CO. PHOTO-LITH. 39 & 41 PARK PLACE, N.Y.

UNITED STATES PATENT OFFICE.

JOSHUA HENDY, OF SAN FRANCISCO, CALIFORNIA.

IMPROVEMENT IN ORE-CONCENTRATORS.

Specification forming part of Letters Patent No. 78,089, dated May 19, 1868; reissue No. 6,165, dated December 8, 1874; application filed October 15, 1874.

*To all whom it may concern:*

Be it known that I, JOSHUA HENDY, of San Francisco, California, have invented a new and Improved Concentrator; and I hereby declare the following to be a full, clear, and exact description thereof, reference being had to the accompanying drawings, making part of this specification.

The nature of my invention is to provide an improved concentrator for saving finely-divided quicksilver, amalgam, and gold from the sands, and for concentrating and saving the sulphurets contained in ores; and consists of an iron frame of peculiar construction, which holds an oscillating pan having a curvilinear bottom, with a groove around the periphery of the inside of the pan, which gradually descends from a given point to the opposite or discharging point. My invention also relates to a distributer or distributers and stirrers, which are operated by the same power which moves the pan, and through which the pulp passes into the pan, the heavier particles settling into the annular groove, displacing the lighter particles of sand by their gravity and the centrifugal force, while the current of water and the sand and débris tend toward the central discharge-opening, through which they pass out, and at the same time the stirrers agitate the surface of the pan, and prevent the packing of the material which is being treated. My invention also relates to a self-discharging apparatus, and the peculiar construction of the crank-pin attachment, which accommodates itself to the circular line of the oscillations of the pan.

To more fully illustrate and describe my invention, reference is had to the accompanying drawings and letters marked thereon, forming a part of this specification, of which—

Figure 1:
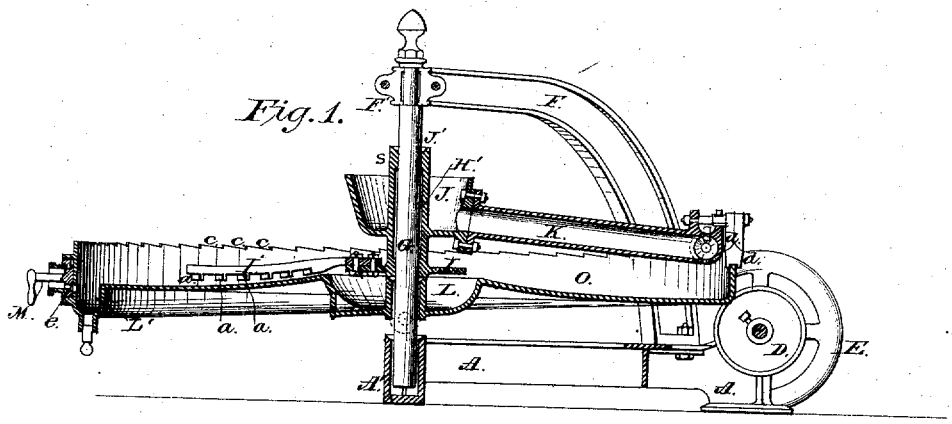
Figure 2:
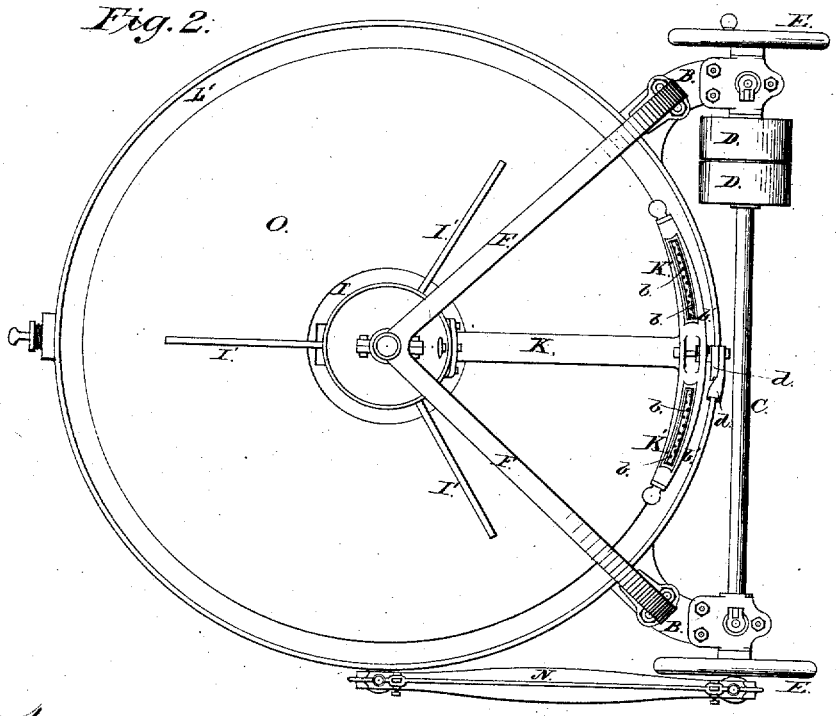

Figure 1 is a side sectional elevation. Fig. 2 is a plan.

A A is the frame, which may be made of cast-iron or other material, and is triangular in form, with projecting ends B B, in which the horizontal shaft C has its bearings. On this shaft are placed ordinary driving and loose pulleys D D; also, at each end fly-wheels E E. F F are supports, bolted to the frame A back of the bearings, for the upper end of the vertical shaft G at the point F′, which has its step in the frame beneath at the point A′. The braces or supports F F, in some cases, may be dispensed with; and the vertical shaft can be made stationary, and the frame and the pan be made to turn on the shaft by forming the hub longer, and making the upper end solid for supporting the pan on the shaft.

The construction and disposition of the frame and braces or supports relative to a pan of this description are such that much strength is obtained with less amount of material, making the machine more easily transportable to remote regions; also, the frame and supports are out of the way of the movements of the pan and operator.

Prior to my invention the devices for imparting the oscillating movement to the pans have commonly been a revolving shaft having a cam at each end, which cam is connected directly with the pan at its opposite sides, or else a similar revolving shaft having cranks at each end, that connected with the pan at its opposite side by means of two pitmen or connecting-rods. The cams and the cranks were placed on opposite sides of the revolving shaft, so that the crank or cam on one end of a shaft furnished a motion in one direction, while the crank or cam on the other end of the same shaft furnished a motion in the opposite direction. As the cranks or cams on the opposite ends of the revolving shaft connected with the pan at its opposite sides, it followed that one side of the pan moved in one direction, while the opposite side moved in the opposite direction, and thus produced the oscillation required. In these cases it became impracticable to construct a concentrating-pan with a fixed center, as any variation in the length of the opposite cranks or pitmen, or in the eccentricity of the opposite cams, would give to some a reciprocating motion to the center of the pan. As in practice these variations would occur by wear, and were even difficult to avoid in the original construction of the machines on account of the extreme nicety required in making and adjusting cranks and pitmen to exact lengths, and making each one of the different cams to furnish exactly the same amount of motion as the other, the centering shaft or step upon which the pan oscillated was left loose, so as to allow, to some extent, of a reciprocating motion for the center of the pan.

By these arrangements it was impracticable to keep the pan at all times in the exactly-level position required to obtain from it the best results, and it was very difficult to keep the machines in order.

In my arrangement the pan is fitted immovably upon, and is carried by, the vertical shaft G, and the shaft G descends into the step beneath. The shaft G oscillates in the step, but is fitted into it so closely that it has no room to reciprocate or move sidewise in any direction. The connection of the shaft G with the overreaching braces F at the point F′ assists in holding it firmly in a single position.

In one instance a single cam was tried, the pan being held to its place by a lengthened hollow hub instead of a shaft, which hub did not carry or support the weight of the pan. In that case the weight of the pan was supported by rods from above.

By adopting the combination of a single cam or crank and pitmen with the pan that is carried upon and held firmly to its place by a vertical oscillating shaft, I have succeeded in manufacturing a concentrator that is cheap to make and has proved efficient for the work designed; besides, it enables me to drive two pans thus mounted from a single shaft, and with one set of pulleys.

Below the hopper is a circular plate, I, to which are attached radial arms I′ I′, and from which depend rake-like teeth or pins *a a a a*, which act as agitators or stirrers to prevent the sand from packing near the center of the pan, where the motion is diminishing. These teeth are set at an incline to force the heavier particles toward the periphery of the pan. An oil-groove, H′, is made either in the hubs of the pan or on the shaft for lubricating the step. Above the plate is a feeding and discharging hopper, J, from whence the pulp or tailings pass and flow down the arm or pipe K into a T-shaped distributer, K′ K′, pierced at the bottom with holes *b b b*, and also having at the top slots *b′ b′*, which slots are for the purpose of cleaning and removing obstructions and giving notice of the stoppage of the discharge through the perforations to the operator by overflowing. The cross-pipe forming the outer end of the distributer is made to conform to the curve of the pan, and one or more distributers may be employed in one pan. They can be made stationary or movable. When movable it may be revolved by having the top of the rim of the pan notched into a saw-like edge, *c c c*, in which two pawls, *d d*, attached to the end of the distributer, traverse, and by means of these each oscillation sends the distributer one notch forward in its circuit, and the momentum acquired assists in making the motion continuous. These distributers take the place of the sheet-iron distributing-covers heretofore used, which covered nearly the whole pan, and hid its working operation and contents from view, and which had to be removed when it was necessary to clean out the pans. I call them open distributers. The center of the hopper is a sleeve, *s*, and is stationary, or turns on the shaft, and has an oil-cavity, J′, in the end for lubricating the sleeve and shaft. L′ is a descending channel or annular groove around the periphery of the pan, gradually declining from a certain point to an opposite or discharging point. At this point is an opening through the bottom of the pan for discharging the amalgam and quicksilver that may be present. A plug closes this opening, except when it is desired to draw off the amalgam or quicksilver. Above this opening other openings are made through the side of the pan, and a gate or valve, M, serves to open and close the same at pleasure. M is made flat, with an opening through it, and is turned by means of its handle. One or more holes are made through the side of the pan, each of which holes will come immediately in front of the opening through the gate or valve M when the gate or valve is revolved to the necessary position. By partially revolving this gate or valve the openings through the side of the pan are closed and opened at pleasure, and the height at which the heavy material will be discharged from the pan can be regulated by having the openings through the side of the pan made at different elevations, and in a circle, so that the opening in the gate or valve M, as it is revolved, will, in turn, come in front of the pan, and thus form a continuous opening through both the side of the pan and the gate M.

The gate M can be fastened to the side of the pan by any of the ordinary devices which will permit it to revolve.

The connecting-rod N is so disposed that it accommodates itself particularly to the circular line of direction in which the pan is caused to oscillate, and is provided with a ball-crank pin, N′, at one end, and a wrist-ball pin at the other. The wrist-pin is secured to the pan through a lug, and the attachment made to the crank-shaft at the opposite end.

The pan O should be placed on a level with the central discharge, and unless it is so placed it is out of the question to expect it to do its duty to its best advantage; and while in operation the pan should be kept about half full of sulphurets, and as they accumulate over that amount the gate or valve M is opened, when the discharging is commenced.

The operation of the machine is such that grains of any kind, whatever may be their weight or size, will seek the periphery of the pan, and, unless discharged, will there remain until other grains of greater specific gravity take their place. Consequenty, for a short space of time after starting the machine the periphery will be partially filled with sand. It is therefore necessary to allow a quantity of sulphuret sufficient to completely occupy the space to accumulate before the gate is opened and their discharging commenced, which may be continuous or not, according to the richness of the sulphuret in the pulp or tailings.

The concentrator can be set in pairs, for which a single crank-shaft will suffice.

The following are the movements which take place in my machine: The gate being closed, the pan is started by the belt-connection or otherwise, and the feed of pulp or tailings commences. Particles of all kinds rush to the periphery of the pan. The lighter are gradually displaced by the heavier particles, of which latter the larger keep at the top. This is continued until a certain depth of the fine heavy particles has accumulated. The discharge-gate is then opened to the proper extent, and a continuous flow of this fine heavy matter is the result. As the larger particles of the heavier matter accumulate they will, after a time, outnumber the smaller, and will begin to find their way out with them, while the larger light particles will begin to crowd each other out at the center with the finer portion of the waste, making my machine act in the capacity of a sizing apparatus, as well as a concentrator, without the application of sieves or other devices to accomplish that desired object, which, at best, are slow and imperfect in their operations.

Having thus described my invention, what I claim, and desire to secure by Letters Patent, is—

1. The pan O, having a convex or curvilinear surface, and provided with the annular groove L′ around the periphery, declining from a certain point to an opposite or discharging point, substantially as and for the purpose set forth.

2. The concentrating-pan O, constructed with a curvilinear surface, and provided with the discharge valve or gate M, turned by means of a handle, whereby it is caused to open or close either of the several discharge-holes in the side of the pan, substantially as and for the purpose set forth.

3. The open distributer K′ K′ K′, pierced at the bottom with the holes *b b b*, and having at the top the slots *b′ b′*, substantially as and for the purpose specified.

4. In combination with the distributer provided with a pawl, the pan O, having a notched rim, forming a ratchet, substantially as and for the purpose set forth.

5. The triangular frame A A, provided with the projecting ends B, in combination with an oscillating pan, substantially as and for the purpose described.

6. The overreaching supports or braces F F, connecting at the point F′, and in which the upper end of the vertical shaft turns, in combination with the frame A A, with the projecting ends B B, and an oscillating pan, substantially as described.

In witness whereof I have hereunto set my hand and seal.

JOSHUA HENDY. [L. S.]

Witnesses:
JNO. L. BOONE,
C. M. RICHARDSON.